June 6, 1967 J. C. POWELL 3,323,378
CONTROL APPARATUS

Filed Nov. 12, 1963 3 Sheets-Sheet 1

INVENTOR.
JERRY C. POWELL
BY
ATTORNEY

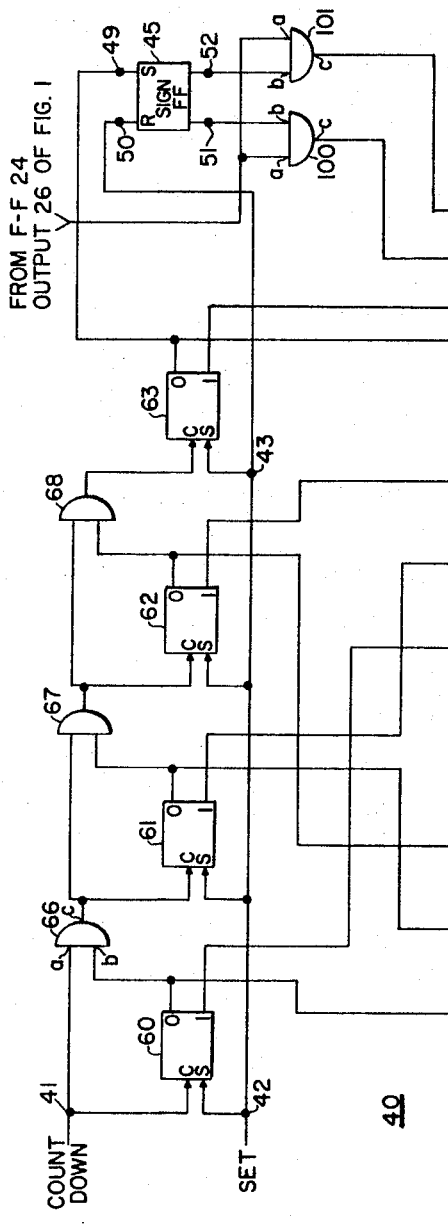
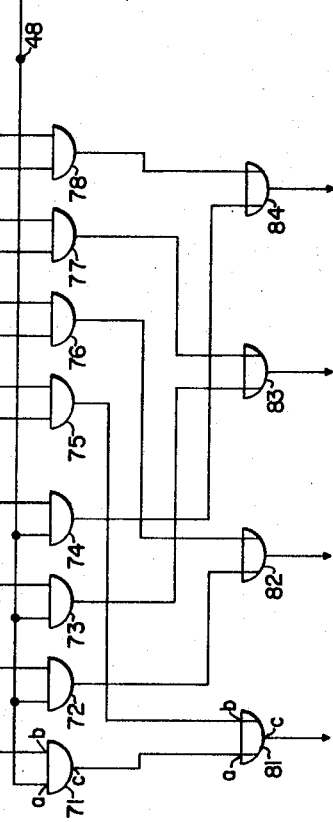
FIG. 2
FIG. 6
INVENTOR.
JERRY C. POWELL
BY Roger W. Jensen
ATTORNEY June 6, 1967     J. C. POWELL     3,323,378
CONTROL APPARATUS Filed Nov. 12, 1963     3 Sheets-Sheet 3

*INVENTOR.*
JERRY C. POWELL

BY Roger W. Jensen
ATTORNEY

United States Patent Office 3,323,378
Patented June 6, 1967

3,323,378
CONTROL APPARATUS
Jerry C. Powell, Minneapolis, Minn., assignor to Honeywell Inc., a corporation of Delaware
Filed Nov. 12, 1963, Ser. No. 322,811
11 Claims. (Cl. 74—5.6)

The present invention relates to inertial instruments and more particularly to gyroscopes.

It is well known in prior art, that two gyroscopes can provide complete attitude information of the orientation of a body on which the gyroscopes are carried. To provide such complete information at least two gyroscopes were required. This was due to the fact that it was possible to measure angular displacement about any axis substantially perpendicular to the spin axis of the inertial member, but it was thought impossible to measure angular displacement about the spin axis itself unless an additional gyroscope was provided with the spin axis of its member oriented substantially perpendicular to the spin axis of the inertial member of the first gyroscope. Information of the angular displacement about two mutually perpendicular axes, each normal to the spin axis of the inertial member, can readily be obtained with prior art techniques. It becomes clear that if a way could be found to measure the rotational motion about the spin axis without the requirement of the additional gyroscope, it would become possible to obtain complete, all axis attitude information from a single gyroscope. The present invention teaches how the angular displacement about the spin axis can be measured. A particular way the present invention can be mechanized is to place a mark near the equatorial region on the inertial member and then keep track of this mark. The relative motion of the mark and the base on which the inertial member is supported, is the difference between the angular velocity of the inertial member and the angular velocity of the base itself, as observed from a frame of reference fixed in inertial space. If the angular velocity of the inertial member is a measurable constant or can be accurately predicted, then the information regarding the motion of the base can be obtained by subtracting the angular velocity of the inertial member from the measured relative angular velocity of the inertial member and the base.

By inertial frame of reference or a frame of reference fixed in the inertial space is meant a frame of reference whose angular relation to the spin axis of a perfect gyroscope will remain unchanged with the passage of time. When speaking of the angular velocity or displacement of the inertial member or the base, without further qualification, it will be understood that the velocity is observed relative to the inertial frame of reference.

In prior art instruments in which the inertial members were mechanically supported the angular velocity of the inertial member did not remain constant, nor could it be predicted with any degree of accuracy, because of the large frictional forces acting on the member. In the new generation of the inertial instruments, in which the inertial member is supported by means of electric or magnetic field forces, the influence of friction has been practically eliminated and the angular velocity of the inertial member is relatively constant or varying at a slow rate which can be accurately predicted. In such instruments the present invention finds best application.

It is therefore an object of the present invention to provide an inertial instrument which will give information of the angular displacement of the inertial member about its spin axis.

A further object of the present invention is to provide a single inertial instrument which will provide all axes attitude reference information.

These and further objects will become more apparent upon inspection of the following specification, claims, and drawings in which:

FIGURE 2 is a logic diagram depicting a counter which might be used in the apparatus of FIGURE 1;

FIGURE 6 depicts, in binary number system, a sequence of outputs from counter of FIGURE 2.

Figure 1:
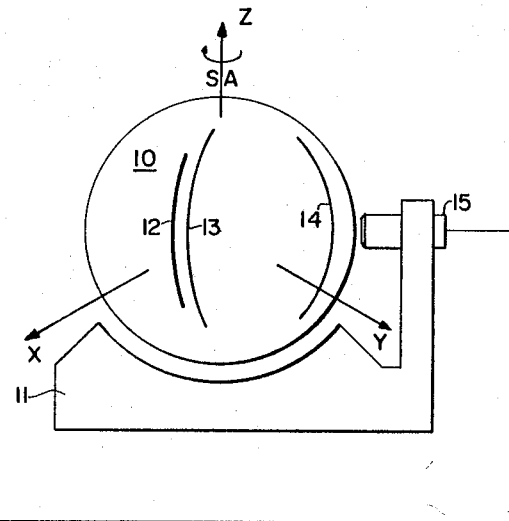
FIGURE 1 shows one possible embodiment of an apparatus including a logic circuit, for measuring the angular displacement about the spin axis.
Figure 1:
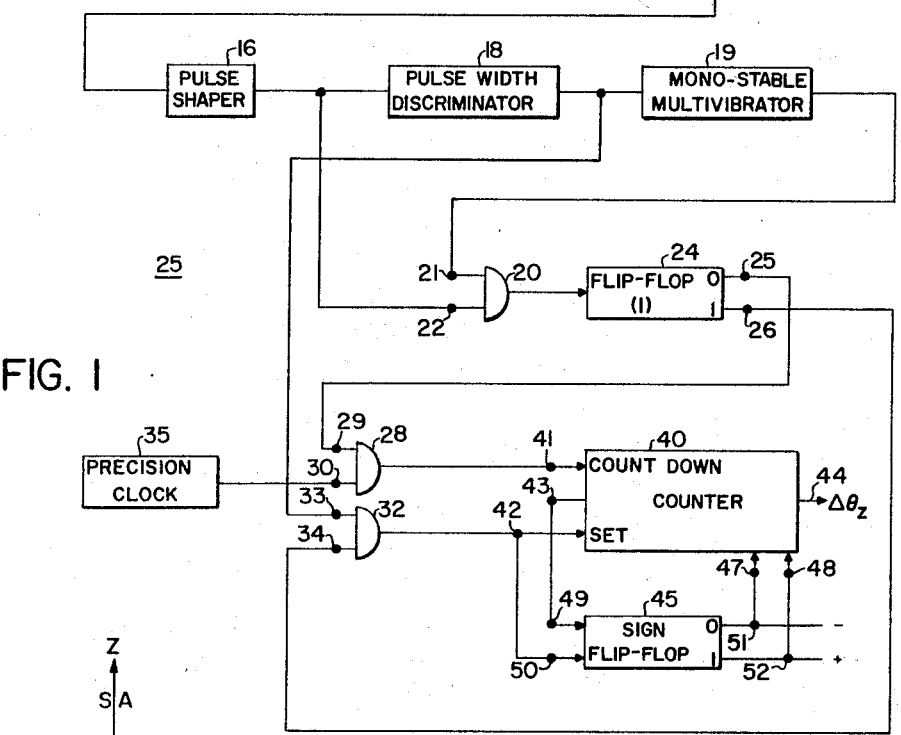

Referring now to FIGURE 1, an inertial member 10 is universally supported on a base 11. Inertial member 10 is adapted for rotation about a spin axis Z and has its equatorial plane defined by mutually perpendicular axes X and Y. Various means for supporting and imparting angular velocity to the inertial member are known to those skilled in the art. An example can be found in U.S. Patent 3,003,356. Inertial member 10 further has a pattern thereon comprised of lines 12, 13, and 14. A pickoff 15, adapted to sense the pattern on the inertial member 10, is supported on base 11 and adjacent to the equatorial region of inertial member 10. Pickoff 15 provides an electrical output signal indicative of the pattern sensed. The output of pickoff 15 is connected to the input of a pulse shaper 16. The output of pulse shaper 16 is connected in parallel to the input of a pulse width discriminator 18, and an input terminal 22 of an AND gate 20. AND gate 20 further has an input terminal 21 and has its output connected to the input of a flip-flop 24. The output of pulse width discriminator 18 is connected to the input of a mono-stable multivibrator 19 which has its output connected to input terminal 21 of AND gate 20, and also to input 33 of AND gate 32. AND gate 32 has a second input 34 and has its output connected to an input terminal 42 of a counter 40.

Flip-flop 24 has output terminals 25 and 26. Output terminal 25 is connected to an input terminal 29 of an AND gate 28 and output terminal 26 of flop-flop 24 is connected to input terminal 34 of AND gate 32. AND gate 28 further has an input terminal 30 connected to the output of a precision high frequency clock 35. The output of AND gate 28 is connected to an input terminal 41 of counter 40. Counter 40 further has input terminals 42, 47 and 48 and output terminals 43 and 44. Output terminal 43 of counter 40 is connected to an input terminal 49 of a flip-flop 45. Flip-flop 45 further has an input terminal 50 and output terminals 51 and 52. Output terminal 51 of flip-flop 45 is connected to input terminal 47 of counter 40 and output terminal 52 of flip-flop 45 is connected to input terminal 48 of counter 40. The signal at the output terminal 44 of counter 40 is proportional to the angular displacement of base 11 about spin axis Z of inertial member 10.

A typical pattern presently used on the inertial members of electrically or magnetically supported gyroscopic instruments, for the purpose of determining the angular displacement of the supporting mechanism about axes perpendicular to the spin axis, is comprised of a number of contrasting lines or surfaces as depicted in FIGURE 1. With proper design, the same pattern can be used in combination with a pickoff for the purpose of determining the angular displacement of the supporting mechanism about the spin axis of the inertial member. Proper logic circuit design will eliminate all but relevant portions of the signals from the pickoff.

FIGURE 2 depicts a typical counter which can be used in the apparatus of FIGURE 1. The counter is comprised of four flip-flop stages 60, 61, 62, and 63. Each flip-flop has a first input labeled C. A signal appearing at this input will cause the flip-flop to change its state. Each flip-flop also has a second input labeled S at which a signal can be presented to set the flip-flops to a predetermined state. Each flip-flop further has a first output labeled 0 and second output labeled 1, as is customary in the art. The counter also includes AND gates 66, 67, and 68, each said AND gate having inputs a and b and an output c. The input terminal 41 of counter 40 is connected to input C of flip-flop 60 and also to input a of AND gate 66. The input terminal 42 of counter 40 is connected directly to all S inputs of flip-flop 60, 61, 62 and 63. Output 0 of flip-flop 60 is connected to input b of AND gate 66. The output c of AND gate 66 is connected in parallel to the C input of flip-flop 61 and the a input of AND gate 67. Output 0 of flip-flop 61 is connected to input b of AND gate 67. Output of AND gate 67 is connected in parallel to input C of flop-flop 62 and input a of AND gate 68. Output 0 of flip-flop 62 is connected to input b of AND 68. The output of AND gate 68 is connected to input C of flip-flop 63. Only four stages of the counter are shown here for illustrative purposes. It should be understood, however, that the number of stages employed is dictated by the size of the number which the counter will be required to handle.

Additional elements of the counter include AND gates 71 through 78 and OR gates 81 through 84. Each AND gate has input terminals a and b and an output terminal c. Each OR gate also has input terminals a and b and an output terminal c. The 0 outputs of flip-flops 60, 61, 62 and 63 are connected to the b inputs of AND gates 71, 72, 73 and 74, respectively. Similarly the 1 outputs of flip-flops 60, 61, 62 and 63 are connected to the b inputs of AND gates 75, 76, 77 and 78, respectively.

Sign flip-flop 45, also shown in FIGURE 1, has input terminals 49 and 50 and output terminals 51 and 52. Input terminal 50 of flip-flop 45 is connected to terminal 43 which in turn is connected directly to input terminal 42 of counter 40. Input terminal 49 of flip-flop 45 is connected to the 0 output of flip-flop 63. Input terminal 49 is connected to the 0 output of the last stage in the counter. The output terminal 51 of flip-flop 45 is connected to an input b of an AND gate 100. AND gate 100 further has an input a and an output c. Output terminal 52 of flip-flop 45 is connected to an input b of an AND gate 101. AND gate 101 further has an input a and an output c. Inputs a of AND gates 100 and 101 are connected to output 26 of flip-flop 24 shown in FIGURE 1. Output c of AND gate 100 is connected in parallel to inputs a of AND gates 75 through 78 and output c of AND gate 101 is connected in parallel to input a of AND gates 71 through 74. Outputs c of AND gates 71, 72, 73 and 74 are connected to inputs a of OR gates 81, 82, 83 and 84 respectively and outputs c of AND gates 75, 76, 77 and 78 are connected to inputs b of OR gates 81, 82, 83 and 84 respectively.

Figure 4:
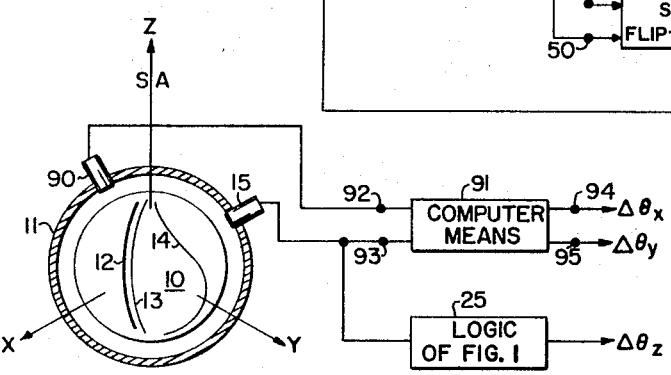
FIGURE 4 shows one possible embodiment of a gyroscopic instrument capable of providing all-axes attitude information.

In FIGURE 4 inertial member 10 is supported within an envelope 11 for rotation about a spin axis Z. Additional axes X and Y are shown to lie within the equatorial plane of inertial member 10 being mutually perpendicular to each other and to spin axis Z. The surface of inertial member 10 is characterized by a pattern comprised of lines 12, 13, and 14. A pair of optical pickoffs 15 and 90 are mounted on envelope 11 and adapted to observe the surface of inertial member 10 providing electrical outputs indicative of the surface reflectance variations. The output of pickoff 90 is connected directly to an input terminal 92 of a computer means 91. Computer means 91 further has an input terminal 93 and output terminals 94 and 95. The output of pickoff 15 is connected to input terminal 93 of computer means 91 and also to the input of a logic circuit 25. Logic circuit 25 could be such as illustrated in FIGURE 1 and the output signal of logic circuit 25 would be indicative of the displacement of envelope 11 about spin axis Z. The signal appearing at output terminal 94 of computer means 91 is indicative of angular displacement about the X axis, and the signal appearing at output terminal 95 is indicative of the angular displacement about the Y axis. The angular separation of lines 13 and 14 of the pattern on inertial member 10 varies with latitude as a cosine function. This is similar to the disclosure of U.S. Patent 2,959,060 assigned to the assignee of the present invention. The angular displacement about the X and Y axes can be determined by the techniques shown in the above referenced Kunz patent and will not be discussed here in detail. The block form of FIGURE 4 is included here to illustrate how the present invention makes it possible to obtain all-axes attitude information from a single gyroscopic instrument.

Figure 5:
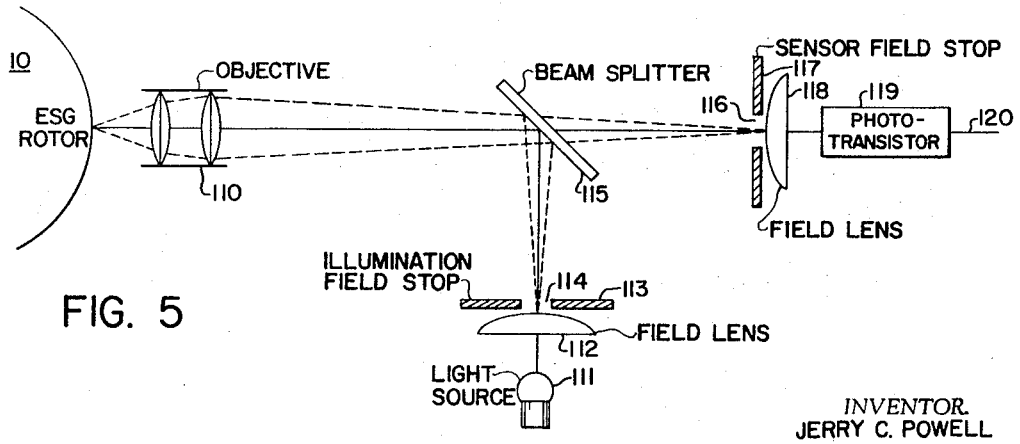
FIGURE 5 shows an optical pickoff which might be employed to detect the pattern on the inertial member.

FIGURE 5 shows one possible embodiment of an optical pickoff to be used in the apparatus of FIGURE 1. The pickoff includes a light source 111. The light from light source 111 is collected by a field lens 112 and the collected light passes through an aperature 114 in an illumination field stop 113. The light is reflected by a beam splitter 115 and is directed through objective lens 110 to illuminate a portion of rotor 10. Beam splitter 115 has a semireflecting surface such as a half-silvered mirror. Some of the light reaching the inertial member 10 is reflected back through objective lens 110 and a portion of this reflected light is allowed to pass through beam splitter 115 and is directed by sensor field stop 117 through a field lens 118 to a photosensor 119 having an output 120. The output signal of photosensor 119 appearing at output 120 is an eletcric signal proportional to the amount of light reflected from rotor 10.

*Operation*

Figure 3:
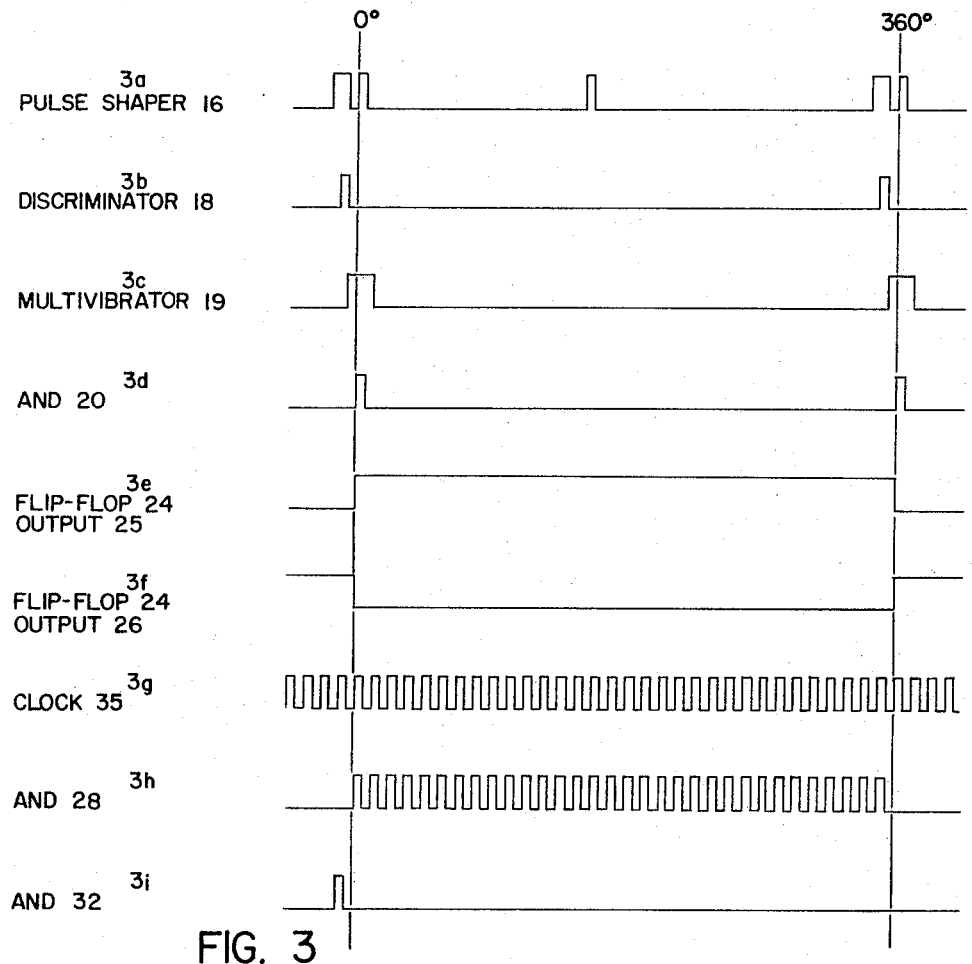
FIGURE 3 shows, on a common time scale, the signals appearing at different points of the logic circuit of FIGURE 1.

In FIGURE 1 inertial member 10 is supported on base 11 for rotation about spin axis Z. As inertial member 10 turns on its spin axis, lines 12, 13 and 14 of the contrasting reflective pattern will pass on successively through the field of view of optical pickoff 15. The output signal from pickoff 15 will be a set of pulses corresponding to the passage of the lines through the field of view of the pickoff. The signal from pickoff 15 is treated by pulse shaper 16 to eliminate the undesirable noise and to equalize the amplitudes of successive pulses. It will be noted that line 12 of the pattern on inertial member 10 is wider than lines 13 and 14 and therefore the pulse produced by line 12 is also longer in time duration. The signal from pulse shaper 16 is passed through pulse width discriminator 18 which eliminates all pulses except those exceeding a certain length of time. Pulse width discriminator 18 is designed so that only pulses produced by line 12 will appear at this output. The signal appearing at the output of pulse shaper 16 is illustrated in FIGURE 3a and the signal appearing at the output of pulse discriminator 18 is illustrated in FIGURE 3b. The monostable multivibrator 19 is triggered with the signals from pulse width discriminator 18. Multivibrator 19 is triggered on the trailing edge of the signal at its input and its output signal is illustrated in FIGURE 3c. The signal from monostable multivibrator 19 is ANDed with the signal from pulses shaper 16 in the AND gate 20 and the output of AND gate 20 is used to operate a flip-flop 24. The signal appearing at the output of AND gate 20 is illustrated in FIGURE 3d. The signal appearing at output 25 of flip-flop 24 is illustrated in FIGURE 3e and the signal appearing at output 26 of flip-flop 24 is illustrated in FIGURE 3f.

Clock 35 provides a uniform frequency output illustrated in FIGURE 3g. The signal from clock 35 is ANDed with the signal from output 25 of flip-flop 24 in AND gate 28. Output signal of AND gate 28 is illustrated in FIGURE 3h. This signal is fed into counter 40 at its input terminal 41. The signal from output terminal 26 of flip-flop 24 is ANDed with the signal from pulse width discriminator 18 and AND gate 32 and the output signal of AND gate 32 is fed into counter 40 at its input terminal 42 to set the counter. The output signal from AND gate 32 is also fed into flip-flop 45 at its input terminal 50 to reset flip-flop 45 at the beginning of each count cycle. The signal appearing at the output of AND gate 32 is illustrated in FIGURE 3i.

At the beginning of each counting cycle, the signal from AND gate 32 sets the counter to a certain number from which the counter will count down as the pulses enter from AND gate 28 through input terminal 41. The number preset in the counter is such that if at the end of the counting cycle the remainder in the counter is zero the output signal appearing at output 44 will also be zero indicating that no angular displacement of base 11 about spin axis Z has occurred. A remainder in the counter, on the other hand, signifies an angular displacement of base 11 about spin axis Z. The direction of such displacement is indicated by the sign of the remainder which can be determined from the output of flip-flop 45. The operation of counter 40 and sign flip-flop 45 will be more readily understood by referring to FIGURE 2.

A pulse received at input terminal 41 of counter 40 from the output of AND gate 28 is fed to input C of flip-flop 60 and acts to change the condition or state of the flip-flop in a manner well known in the art. The same pulse appearing at terminal 41 is also fed to input $a$ of AND gate 66. AND gate 66 further receives at its input $b$ any signals present at output 0 of flip-flop 60. When output 0 of flip-flop 60 is energized, a pulse appearing at terminal 41 will be allowed to pass through AND gate 66. The trailing edge of this pulse will trigger flip-flop 60, de-energizing its output 0 and energizing its output 1. A pulse appearing at output $c$ of AND gate 66 is fed in parallel to input C of flip-flop 61 and input $a$ of AND gate 67. The operation of this stage and subsequent stages is the same as explained with reference to first stage with flip-flop 60, except that only half as many pulses appear at output $c$ of AND gate 66 as those appearing at terminal 41.

The theory of operation of such counters as shown here is well known in the art and will not be explained here in any further detail. Let it suffice to say that information regarding the number of pulses entering input terminal 41 may be obtained in binary form by looking at the conditions of the outputs of flip-flops 60, 61, 62 and 63. In FIGURE 2 the right most flip-flop 63 carries the most significant binary digit and progressing to the left, each flip-flop in sequence carries the next less significant digit, with flip-flop 60 carrying the digit of least significance. Each energized output represents a 1 and each unenergized output represents a 0 in the binary number system. This is only a convention and opposite could be adopted.

In the present case a signal appears at terminal 42 prior to the beginning of a count cycle, and causes or sets flip-flops 60 through 63 to a predetermined condition. The effect of a pulse at terminal 42 is to place a number into the counter corresponding to the number of pulses from clock 35 whose time duration will equal exactly to the time duration of one revolution of inertial member 10 about spin axis Z. The signal from terminal 42 is also fed through terminal 43 to input terminal 50 of sign flip-flop 45 to reset flip-flop 45 so as to energize its output 52. AND gates 100 and 101, regulating outputs 51 and 52 of flip-flop 45, are energized during the noncounting portion of the cycle by the signal from output 26 of flip-flop 24, shown in FIGURE 1. The purpose of AND gates 100 and 101 is to block the output signals from flip-flop 45 during the time when the counter is counting.

As an example assume that the number preset into the counter is such as shown in FIGURE 6, row $a$ where from left to right the digits are arranged from the most to the least significant. The column labeled "0" represents the conditions of the 0 outputs of flip-flops 60 through 63 and the numbers in column "1" represent the conditions at the 1 outputs of flip-flops 60 through 63. With each additional pulse the numbers appearing at 0 outputs decreases by one, while the number appearing at 1 outputs increases by one. As the counter counts down to zero, a situation as illustrated by row $b$ of FIGURE 6 exists, where the count in the "1" column is equal to the maximum capacity of the counter. After the next pulse the count in the "0" column changes to the maximum while the count in "1" column changes to zero. As the count in "0" column changes from 0 to maximum the 0 output of flip-flop 63 becomes energized, changing the state of sign flip-flop 45.

If the counting period is shorter than the number of pulses represented by the preset count in the counter, a positive remainder will remain in the counter, the magnitude of which can be determined by observing the 0 outputs of flip-flops 60 through 63.

Should the time duration of the counting cycle, however, be greater than the number of pulses represented by the preset count in the counter, the 0 output of flip-flop 63 will be energized, changing the condition of sign flip-flop 45 from a positive to a negative output representing a negative remainder. The magnitude of the negative remainder will appear at the 1 outputs of flip-flops 60 through 63.

At the end of a counting cycle the information from the appropriate outputs of flip-flops 60 through 63 is transferred to the outputs of OR gates 81 through 84. At this time output 26 of flip-flop 24 becomes energized, energizing AND gates 100 and 101. If the remainder in the counter is positive, output 52 of flip-flop 45 will be energized, energizing AND gates 71 through 74, and transmitting the information from the 0 outputs of flip-flops 60 through 63 to the OR gates 81 through 84 respectively. If, however, the remainder is negative, output 51 of flip-flop 45 is energized enabling AND gates 75 through 78 to pass the information from the 1 outputs of the counter to OR gates 81 through 84. The information appearing at outputs 81 through 84 may be displayed or recorded in the manner well known in the art.

The counter is designed so that its capacity is sufficiently larger than the number preset into the counter that the zero output of the most significant flip-flop will not become energized except after the count passes through zero, when the zero outputs of all flip-flops are energized. Whether the remainder in the counter is positive or negative may be determined from the output of sign flip-flop 45. It is arbitrarily assigned that if output 51 is energized, a negative remainder exists and if output 52 is energized, a positive remainder exists. The sign and the magnitude of the remainder are directly indicative of the direction and the magnitude of the displacement of base 11 about spin axis Z.

In the above discussion it was assumed that the angular velocity of inertial member 10 remained constant. In the newer inertial instruments, where the inertial members are supported by means of electric fields, this approximation will yield good results for at least short periods of time. It has been found, furthermore, that although with the new improved support the inertial member still loses some of its angular velocity with the passage of time, such slowing down of the inertial member can be predicted with good accuracy. It is therefore possible, using present state of the computer art techniques, to incorporate into the present system a computer with a memory unit which would vary the preset number into the counter at the beginning of each count cycle as a function of rundown rate of the inertial member.

FIGURE 4 shows how the present invention can be incorporated into a system which will provide all three axes of attitude information. The output of cumputer means 91 will provide information regarding the angular rotation about the X and Y axes. How this can be accomplished is discussed in U.S. Patent 2,959,060. The output of logic 25 explained with reference to FIGURES 1 and 2 will provide information regarding the angular rotation about the Z axis.

Many variations and embodiments are possible within the spirit of this invention. It is, therefore, understood that the specific embodiment of my invention shown here is for the purpose of illustration only and that my invention is limited only by the scope of the appended claims.

What is claimed is:

1. An inertial instrument capable of providing all axes of attitude information, said instrument comprising:
   a base;
   a spherical inertial member, universally supported on said base and adapted for rotation about a spin axis;
   first measuring means for measuring relative rotation between said member and said base about any axis at an angle to said spin axis; and
   second measuring means for measuring the angular displacement of said base about said spin axis relative to an inertial frame of reference, said second measuring means comprising
      third measuring means for measuring the angular displacement of said member about said spin axis relative to said base,
      signal generating means for generating a signal indicative of the angular displacement of said member about said spin axis relative to said inertial frame of reference, and
      difference means connected to said third measuring means and to said signal generating means for finding the difference between the angular displacement of said member about said spin axis relative to said base and the angular displacement of said member about said spin axis relative to said inertial frame of reference, said difference being indicative of the angular displacement of said base about said spin axis relative to said inertial frame of reference.

2. An inertial instrument capable of providing all axes of attitude information, said instrument comprising:
   a base;
   an inertial member, universally supported on said base and adapted for rotation about a spin axis; means for measuring relative rotation between said member and said base about any axis at an angle to said spin axis; and
   means for measuring the angular displacement of said base about said spin axis relative to an inertial frame of reference, said means comprising
      measuring means for measuring the angular displacement of said number about said spin axis relative to said base,
      signal generating means for generating a signal indicative of the angular displacement of said member about said spin axis relative to said inertial frame of reference, and
      difference means connected to said measuring means and to said signal generating means for finding the difference between the angular displacement of said member about said spin axis relative to said base and the angular displacement of said member about said spin axis relative to said inertial frame of reference, said difference being indicative of the angular displacement of said base about said spin axis relative to said inertial frame of reference.

3. An inertial instrument capable of providing all axes of attitude information, said instrument comprising:
   a base;
   an internal member, universally supported on said base and adapted for rotation about a spin axis; and
   means for measuring the angular displacement of said base about said spin axis relative to an inertial frame of reference, said means comprising
      measuring means for measuring the angular displacement of said member about said spin axis relative to said base,
      signal generating means for generating a signal indicative of the angular displacement of said member about said spin axis relative to said inertial frame of reference, and
      difference means connected to said measuring means and said signal generating means for finding the difference between the angular displacement of said member about said spin axis relative to said base and the angular displacement of said member about said spin axis relative to said inertial frame of reference said difference being indicative of the angular displacement of said base about said spin axis relative to said inertial frame of reference.

4. Apparatus of the class described comprising:
   a base;
   a member, supported on said base and adapted for rotation about a spin axis; and
   means for measuring the angular displacement of said base about said spin axis relative to an inertial frame of reference, said means comprising
      measuring means for measuring the angular displacement of said member about said spin axis relative to said base,
      signal generating means for generating a signal indicative of the angular displacement of said member about said spin axis relative to said inertial frame of reference, and
      means connected to said measuring means and to said signal generating means for finding the difference between the angular displacement of said member about said spin axis relative to said base and the angular displacement of said member about said spin axis relative to said inertial frame of reference, said difference being indicative of the angular displacement of said base about said spin axis relative to said inertial frame of reference.

5. An inertial instrument comprising:
   a base;
   a spherical inertial member universally supported on said base and adapted for rotation about a spin axis at a substantially constant angular velocity;
   first measuring means for measuring relative rotation between said member and said base about any axis substantially perpendicular to said spin axis; and
   second measuring means for determining the angular displacement of said base about said spin axis relative to an inertial frame of reference, said second measuring means including
      a reflective pattern on said member consisting of a segment of a line on the surface of said member, formed by the intersection of said member and a plane determined by said spin axis and a point removed from said spin axis,
      a source of light on said support illuminating at least a portion of said member,
      light sensing means positioned on said support and adapted to sense the light reflected from said member and provide an electrical output signal indicative of the light sensed thereby, and
      a logic circuit connected to said light sensing means to receive the electrical signal from said light sensing means and to provide an output signal indicative of the angular displacement of said base about said spin axis relative to said inertial frame of reference.

6. An inertial instrument comprising:

a base;

an inertial member universally supported on said base and adapted for rotation about a spin axis at a substantially constant angular velocity;

first measuring means for measuring relative rotation between said member and said base about any axis substantially perpendicular to said spin axis; and second measuring means for determining the angular displacement of said base about said spin axis relative to inertial space, said second measuring means including a radiative pattern on said member consisting of a segment of a line on the surface of said member, formed by the intersection of said member and a plane determined by said spin axis and a point removed from said spin axis, radiation sensing means positioned on said support and adapted to sense the light reflected from said member and provide an electrical output signal indicative of the radiation sensed thereby, and a logic circuit connected to said radiation sensing means to receive said signal from said radiation sensing means and to provide an output signal indicative of the angular displacement of said base about said spin axis relative to said inertial frame of reference.

7. An inertial instrument comprising:

a base;

an inertial member universally supported on said base and adapted for rotation about a spin axis at a substantially constant angular velocity; and means for determining the angular displacement of said base about said spin axis relative to inertial space, said means including a reflective pattern on said member consisting of a segment of a line on the surface of said member, formed by the intersection of said member and a plane determined by said spin axis and a point removed from said spin axis, a source of light on said support illuminating at least a portion of said rotor, light sensing means positioned on said support and adapted to sense the light reflected from said member and provide an output signal indicative of the reflected light sensed thereby, and a logic circuit connected to said light sensing means to receive the electrical signal from said light sensing means and to provide an output signal indicative of the angular displacement of said base about said spin axis relative to said inertial frame of reference.

8. An inertial instrument comprising:

a base;

an inertial member supported on said base and adapted for rotation about a spin axis at a substantially constant angular velocity; and means for determining the angular displacement of said base about said spin axis relative to inertial space, said means including a radiative pattern on said member consisting of a segment of a line on the surface of said member, radiation sensing means positioned on said support and adapted to sense the radiation from said member and provide an output signal, and a logic circuit connected to said radiation sensing means to receive said signal from said radiation sensing means and to provide an output signal indicative of the angular displacement of said base about said spin axis relative to said inertial frame of reference.

9. An inertial instrument capable of providing all axis attitude information, said instrument comprising:

a base;

a substantially spherical inertial member, universally supported on said base and adapted for rotation about a spin axis;

first measuring means for measuring relative rotation between said member and said base about any axis at an angle to said spin axis; and second measuring means for measuring the rotation of said base about said spin axis relative to an external frame of reference, said second measuring means including a pattern on said member including a segment of a line on the surface of said member, means for detecting said pattern on said surface and providing a pulse each time said line on said member passes under a predetermined fixed point on said base, time measuring means connected to said detecting means for measuring the time duration between two consecutive pulses, said time duration being indicative of the angular displacement of said member about said spin axis relative to said base, signal generating means for generating a signal indicative of the angular displacement of said member about said spin axis relative to said external frame of reference, and means connected to said time measuring means and to said signal generating means for finding the difference between the angular displacement of said member about said spin axis relative to said base and the angular displacement of said member about said spin axis relative to said external frame of reference, said differences being indicative of the angular displacement of said base about said spin axis relative to said external frame of reference.

10. An inertial instrument capable of providing all axis attitude information, said instrument comprising:

a base;

a spherical inertial member, universally supported on said base and adapted for rotation about a spin axis at a predetermined, substantially constant angular velocity relative to an external frame of reference;

first measuring means for measuring relative rotation between said member and said base about any axis at an angle to said spin axis; and second measuring means for measuring the rotation of said base about said spin axis relative to said external frame of reference, said second measuring means including a pattern on said member including a segment of a line on the surface of said member, said line being defined by the intersection of said member and a plane determined by said spin axis and a point on the surface of said member, detecting means for detecting said pattern on said surface and providing a pulse each time said line on said member passes under a predetermined fixed point on said base, time measuring means connected to said detecting means for measuring the time duration between two consecutive pulses, and means connected to said time measuring for finding the difference between the time duration between each said two consecutive pulses and a predetermined time interval indicative of the time duration of one revolution of said inertial member about said spin axis, said difference being indicative of the angular displacement of said base about said spin axis relative to said external frame of reference.

11. An inertial instrument comprising:

a base;

an inertial member, supported on said base and adapted for rotation about a spin axis at a substantially constant angular velocity; and means for measuring the rotation of said base about said spin axis relative to an external frame of reference, said means including a pattern on said member including a segment of a line on the surface of said member, said line being defined by the intersection of said member and a plane determined by said spin axis and a point on the surface of said member, means for detecting said pattern on said surface and providing a pulse each time said line on said member passes under a predetermined fixed point on said base, time measuring means connected to said detecting means for measuring the time duration between two consecutive pulses, and difference means connected to said time measuring means for finding the difference between the time duration between each said two consecutive pulses and a predetermined time interval indicative of the time duration of one revolution of said inertial member about said spin axis, said difference being indicative of the angular displacement of said base about said spin axis relative to said external frame of reference.

References Cited

UNITED STATES PATENTS

| | | | |
|---|---|---|---|
| 2,919,583 | 1/1960 | Parker | 74—5 |
| 2,959,060 | 11/1960 | Kunz | 74—5.6 |
| 3,003,356 | 10/1961 | Nordsieck | 74—5 |
| 3,035,449 | 5/1962 | Hollmann | 73—490 |

FRED C. MATTERN, JR., *Primary Examiner.*

BENJAMIN A. BORCHELT, BROUGHTON G. DURHAM, *Examiners.*

R. F. STAHL, P. W. SULLIVAN, J. D. PUFFER,
*Assistant Examiners.*